United States Patent
Suciu et al.

(10) Patent No.: US 9,234,481 B2
(45) Date of Patent: Jan. 12, 2016

(54) SHARED FLOW THERMAL MANAGEMENT SYSTEM

(75) Inventors: Gabriel L. Suciu, Glastonbury, CT (US); Brian D. Merry, Andover, CT (US); Christopher M. Dye, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 2452 days.

(21) Appl. No.: 12/019,837

(22) Filed: Jan. 25, 2008

(65) Prior Publication Data

US 2009/0188234 A1 Jul. 30, 2009

(51) Int. Cl.
*F02C 7/224* (2006.01)
*F02K 3/115* (2006.01)
*F02C 7/14* (2006.01)
*F02C 7/18* (2006.01)

(52) U.S. Cl.
CPC . *F02K 3/115* (2013.01); *F02C 7/14* (2013.01); *F02C 7/185* (2013.01); *F02C 7/224* (2013.01); *Y02T 50/671* (2013.01); *Y02T 50/675* (2013.01)

(58) Field of Classification Search
USPC ........ 60/204, 226.1, 262, 266, 728, 782, 785, 60/39.83
See application file for complete search history.

(56) References Cited

U.S. PATENT DOCUMENTS

| | | | |
|---|---|---|---|
| 4,991,394 A * | 2/1991 | Wright | 60/226.1 |
| 5,123,242 A * | 6/1992 | Miller | 60/226.1 |
| 5,203,163 A | 4/1993 | Parsons | |
| 5,363,641 A | 11/1994 | Dixon et al. | |
| 5,414,992 A | 5/1995 | Glickstein | |
| 5,553,449 A * | 9/1996 | Rodgers et al. | 60/204 |
| 5,943,856 A | 8/1999 | Lillibridge et al. | |
| 6,105,370 A | 8/2000 | Weber | |
| 6,182,435 B1 | 2/2001 | Niggemann et al. | |
| 6,185,925 B1 | 2/2001 | Proctor et al. | |
| 6,330,995 B1 | 12/2001 | Mangeiga et al. | |
| 6,401,448 B1 | 6/2002 | Manteiga et al. | |
| 6,415,595 B1 * | 7/2002 | Wilmot et al. | 60/785 |
| 6,516,606 B2 | 2/2003 | Fournier et al. | |
| 6,607,165 B1 | 8/2003 | Manteiga et al. | |
| 6,651,441 B2 | 11/2003 | Reuter et al. | |
| 6,708,925 B2 | 3/2004 | Udall | |
| 6,939,392 B2 | 9/2005 | Huang et al. | |
| 7,021,585 B2 | 4/2006 | Loewenstein et al. | |
| 7,055,303 B2 | 6/2006 | Macfarlane et al. | |
| 7,063,503 B2 | 6/2006 | Meisels | |
| 7,063,505 B2 | 6/2006 | Czachor | |
| 7,107,756 B2 | 9/2006 | Rolt | |
| 7,229,247 B2 | 6/2007 | Durocher et al. | |

(Continued)

FOREIGN PATENT DOCUMENTS

EP 0469825 2/1992
EP 2437295 10/2007

OTHER PUBLICATIONS

The Dynamics and Thermodynamics of Compressible Fluid Flow by Ascher H. Shapiro, vol. 1 pp. 49-51; The Ronald Press Company.*

(Continued)

*Primary Examiner* — Arun Goyal
(74) *Attorney, Agent, or Firm* — Carlson, Gaskey & Olds, PC (57) ABSTRACT

A thermal management system includes at least two of a multiple of heat exchangers arranged in an at least partial-series relationship.

25 Claims, 6 Drawing Sheets

(56) References Cited

U.S. PATENT DOCUMENTS

| | | | |
|---|---|---|---|
| 7,229,249 B2 | 6/2007 | Durocher et al. | |
| 7,260,926 B2 | 8/2007 | Sabatino et al. | |
| 7,716,913 B2 * | 5/2010 | Rolt | 60/266 |
| 7,810,312 B2 * | 10/2010 | Stretton et al. | 60/266 |
| 7,926,261 B2 * | 4/2011 | Porte | 60/266 |
| 2003/0019214 A1 | 1/2003 | Shibata | |
| 2007/0245739 A1 | 10/2007 | Stretton | |

OTHER PUBLICATIONS

European Search Report, dated Jun. 6, 2011.

* cited by examiner

SHARED FLOW THERMAL MANAGEMENT SYSTEM

BACKGROUND OF THE INVENTION

The present invention relates to Thermal Management Systems (TMS) with a shared heat exchanger flow.

Thermal Management Systems (TMS) include heat exchangers and associated equipment which exchange gas turbine engine heat with an airflow or fuel flow. Gas turbine engine architecture typically dictates TMS heat exchanger placement.

Conventional TMS heat exchanger locations may partially interrupt the engine thrust airflow and reduce engine efficiency. One conventional TMS heat exchanger placement is typically within a core cowl area and axially deep within a fan cowl. The heat exchanger airflow is ducted inward toward the engine centerline through the heat exchanger, then ducted outward to merge with the bypass flow. Such ducts may be relatively long and serpentine to guide the heat exchanger airflow away from, then back into the bypass flow. This location may also introduce mixing losses which may further detract from engine efficiency.

Heat exchangers are traditionally placed at separate locations within the engine airstreams in order to achieve efficient cooling because temperature-rise restrictions limit the placement of heat exchangers.

SUMMARY OF THE INVENTION

A thermal management system for a gas turbine engine according to an exemplary aspect of the present invention includes a multiple of heat exchangers mounted within a bifurcation area in communication with a bypass flow from the gas turbine engine, at least two of the multiple of heat exchangers arranged in an at least partial-series relationship.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1A:
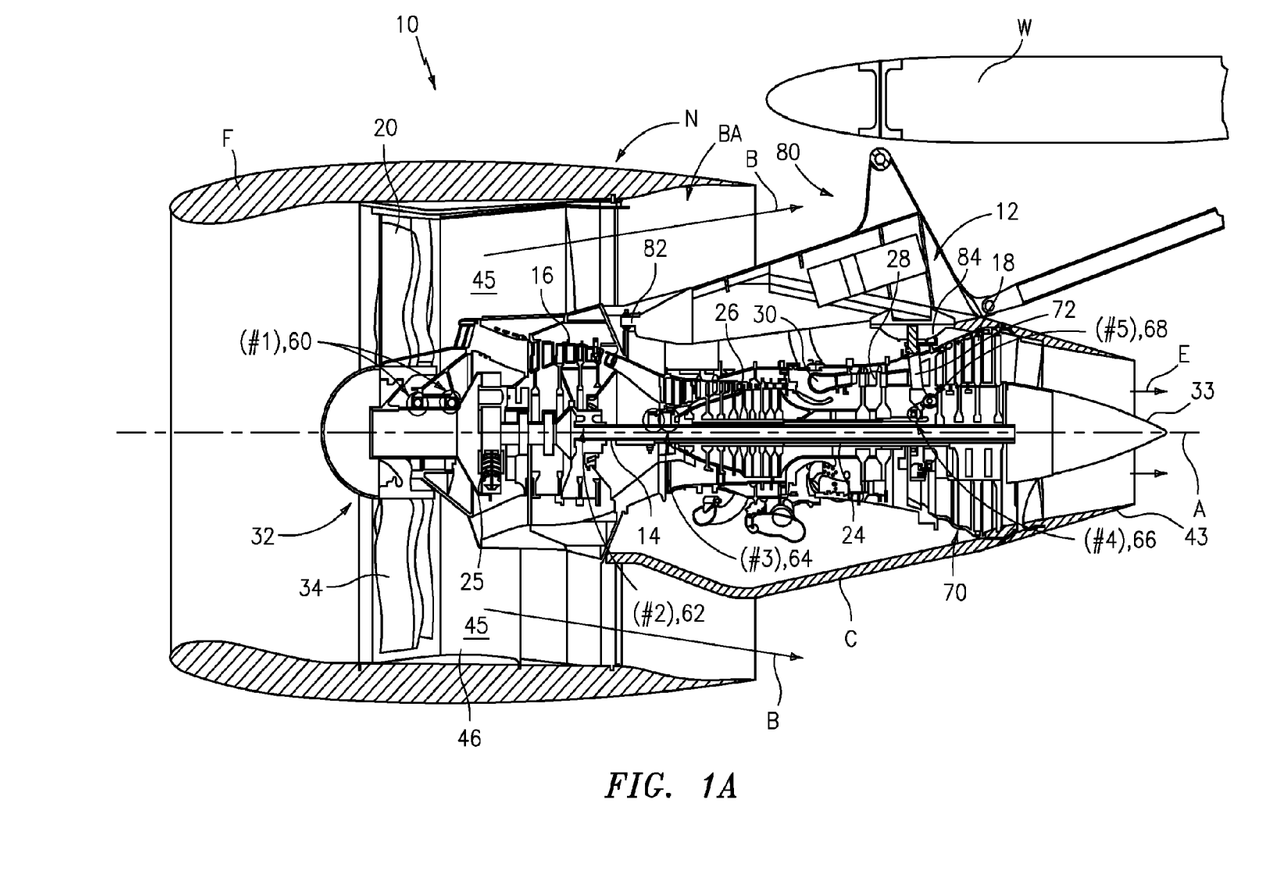
FIG. 1A is a general sectional view through a gas turbine engine along an engine longitudinal axis.

FIG. 1A illustrates a general partial fragmentary schematic view of a gas turbine engine 10 suspended from an engine pylon structure 12 within an engine nacelle assembly N as is typical of an aircraft designed for subsonic operation. It should be understood that although a particular component arrangement is disclosed in the illustrated embodiment, various pylon structures 12 and nacelle assemblies N will benefit herefrom.

The engine 10 includes a core engine within a core nacelle C that houses a low pressure spool 14 and high pressure spool 24. The low pressure spool 14 generally includes a low pressure compressor 16 and low pressure turbine 18. The low pressure spool 14 drives a fan section 20 connected to the low pressure spool 14 either directly or through a gear train 25.

The high pressure spool 24 includes a high pressure compressor 26 and high pressure turbine 28. A combustor 30 is arranged between the high pressure compressor 26 and high pressure turbine 28. The low pressure and high pressure spools 14, 24 rotate about an engine axis of rotation A.

The engine 10 in the disclosed non-limiting embodiment is a high-bypass geared architecture aircraft engine where the engine 10 bypass ratio is greater than ten (10:1), the turbofan diameter is significantly larger than that of the low pressure compressor 16, and the low pressure turbine 18 has a pressure ratio that is greater than 5:1. The gear train 25 may be an epicycle gear train such as a planetary gear system or other gear system with a gear reduction ratio of greater than 2.5:1. It should be understood, however, that the above parameters are only exemplary of one non-limiting embodiment of a geared architecture engine and that the present invention is applicable to other gas turbine engines including direct drive turbofans.

Airflow enters the fan nacelle F which at least partially surrounds the core nacelle C. The fan section 20 communicates airflow into the core nacelle C to the low pressure compressor 16. Core airflow compressed by the low pressure compressor 16 and the high pressure compressor 26 is mixed with the fuel in the combustor 30 ignited, and burned. The resultant high pressure combustor products are expanded through the high pressure turbine 28 and low pressure turbine 18. The turbines 28, 18 are rotationally coupled to the compressors 26, 16 respectively to drive the compressors 26, 16 in response to the expansion of the combustor product. The low pressure turbine 18 also drives the fan section 20 through gear train 25.

A core engine exhaust E exits the core nacelle C through a core nozzle 43 defined between the core nacelle C and a tail cone 33. A bypass flow path 45 is defined between the core nacelle C and the fan nacelle F. The engine 10 generates a high bypass flow arrangement with a bypass ratio in which approximately 80 percent of the airflow entering the fan nacelle 34 becomes bypass flow B. The bypass flow B communicates through the generally annular bypass flow path 45.

Figure 1B:
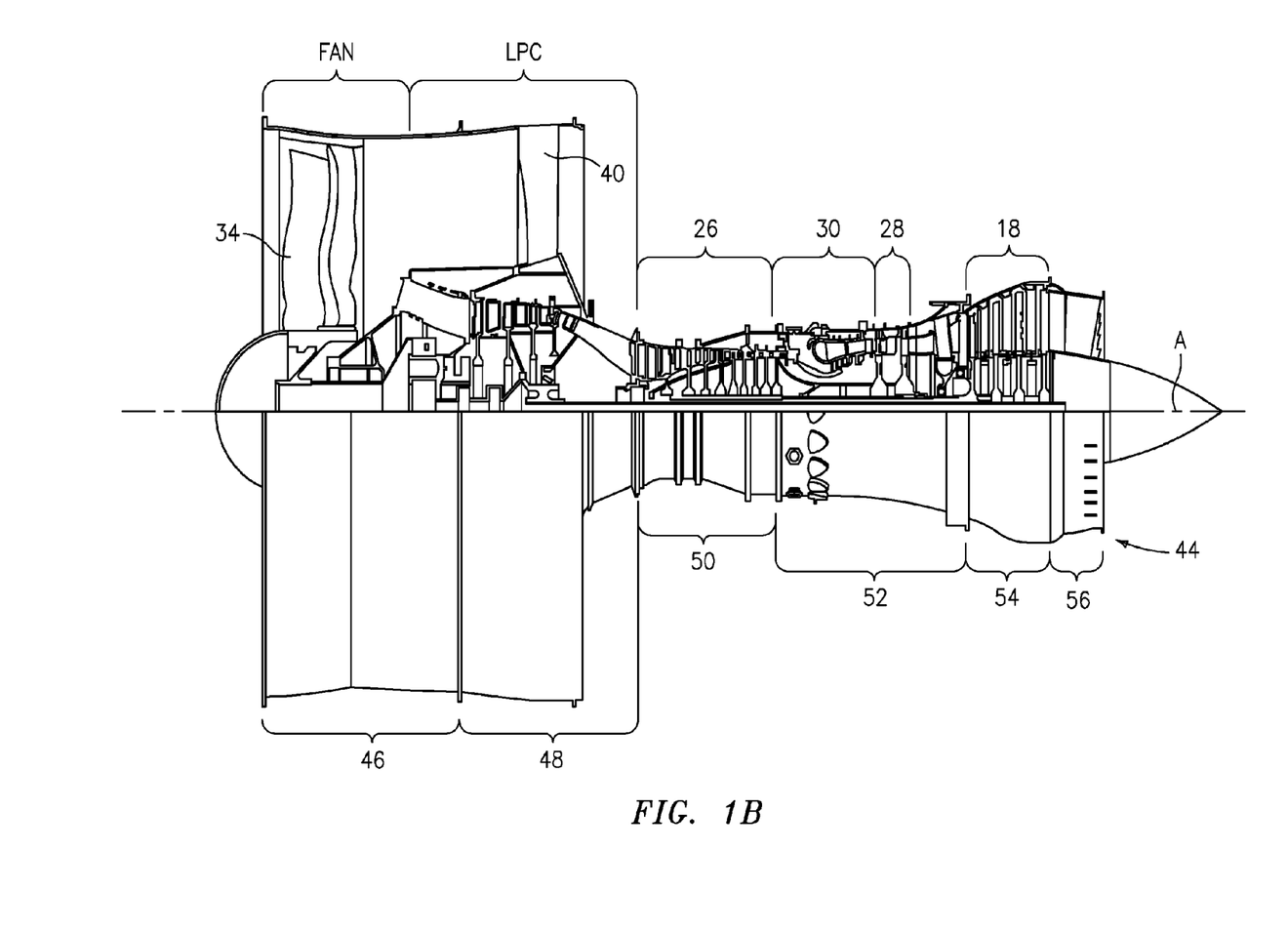
FIG. 1B is a general sectional view through a gas turbine engine along the engine longitudinal axis illustrating an engine static structure case arrangement on the lower half thereof.

An engine static structure 44 generally has sub-structures including a case structure often referred to as the engine backbone. The engine static structure 44 generally includes a fan case 46, an intermediate case (IMC) 48, a high pressure compressor case 50, a thrust case 52, a low pressure turbine case 54, and a turbine exhaust case 56 (FIG. 1B). The fan section 20 includes a fan rotor 32 with a plurality of circumferentially spaced radially outwardly extending fan blades 34. The fan blades 34 are surrounded by the fan case 46.

The core engine case structure is secured to the fan case 46 at the IMC 48 which includes a multiple of circumferentially spaced radially extending struts 40 which radially span the core engine case structure and the fan case 46. The core nacelle C is at least partially supported within the fan nacelle by structure often generically referred to as Fan Exit Guide Vanes (FEGVs), upper bifurcations, lower bifurcations or such like.

The engine static structure 44 further supports a bearing system upon which the turbines 28, 18, compressors 26, 16 and fan rotor 32 rotate. A #1 fan dual bearing 60 which rotationally supports the fan rotor 32 is axially located generally within the fan case 46. The #1 fan dual bearing 60 is preloaded to react fan thrust forward and aft (in case of surge). A #2 LPC bearing 62 which rotationally supports the low pressure spool 14 is axially located generally within the intermediate case (IMC) 48. The #2 LPC bearing 62 reacts thrust. A #3 high spool thrust bearing 64 which rotationally supports the high pressure spool 24 and also reacts thrust. The #3 high spool bearing 64 is also axially located generally within the IMC 48 just forward of the high pressure compressor case 50. A #4 bearing 66 which rotationally supports a rear segment of the high pressure spool 24 reacts only radial loads. The #4 bearing 66 is axially located generally within the thrust case 52 in an aft section thereof. A #5 bearing 68 rotationally supports the rear segment of the low pressure spool 14 and reacts only radial loads. The #5 bearing 68 is axially located generally within the thrust case 52 just aft of the #4 bearing 66. It should be understood that this is an exemplary configuration and any number or combination of bearings may be utilized.

The #4 bearing 66 and the #5 bearing 68 are supported within a mid-turbine frame (MTF) structure 70 to straddle radially extending structural struts 72 which are preloaded in tension. The MTF 70 provides aft structural support within the thrust case 52 for the #4 bearing 66 and the #5 bearing 68 which rotatably support the spools 14, 24.

A dual rotor engine such as that disclosed in the illustrated non-limiting embodiment typically includes a forward frame and a rear frame that support the main rotor bearings. The intermediate case (IMC) 48 also includes the radially extending struts 40 which are generally radially aligned with the #2 LPC bearing 62 (FIG. 1A). It should be understood that various engines with various case and frame structures will benefit herefrom.

The engine 10 is mounted to aircraft structure such as an aircraft wing W through an engine mounting configuration 80 defined by the pylon structure 12. The engine mounting configuration 80 includes a forward mount 82 and an aft mount 84. That is, the pylon structure 12 may include various braces, struts and such like which are surrounded at least in part by an aerodynamic fairing structure. The forward mount 82 is secured to the IMC 48 and the aft mount 84 is secured to the MTF 70 at the thrust case 52. The forward mount 82 and the aft mount 84 are arranged in a plane containing the axis A of the turbofan gas turbine 10. This eliminates thrust links from the intermediate case, which frees up valuable space beneath the core nacelle and minimizes IMC 48 distortion.

Figure 1C:
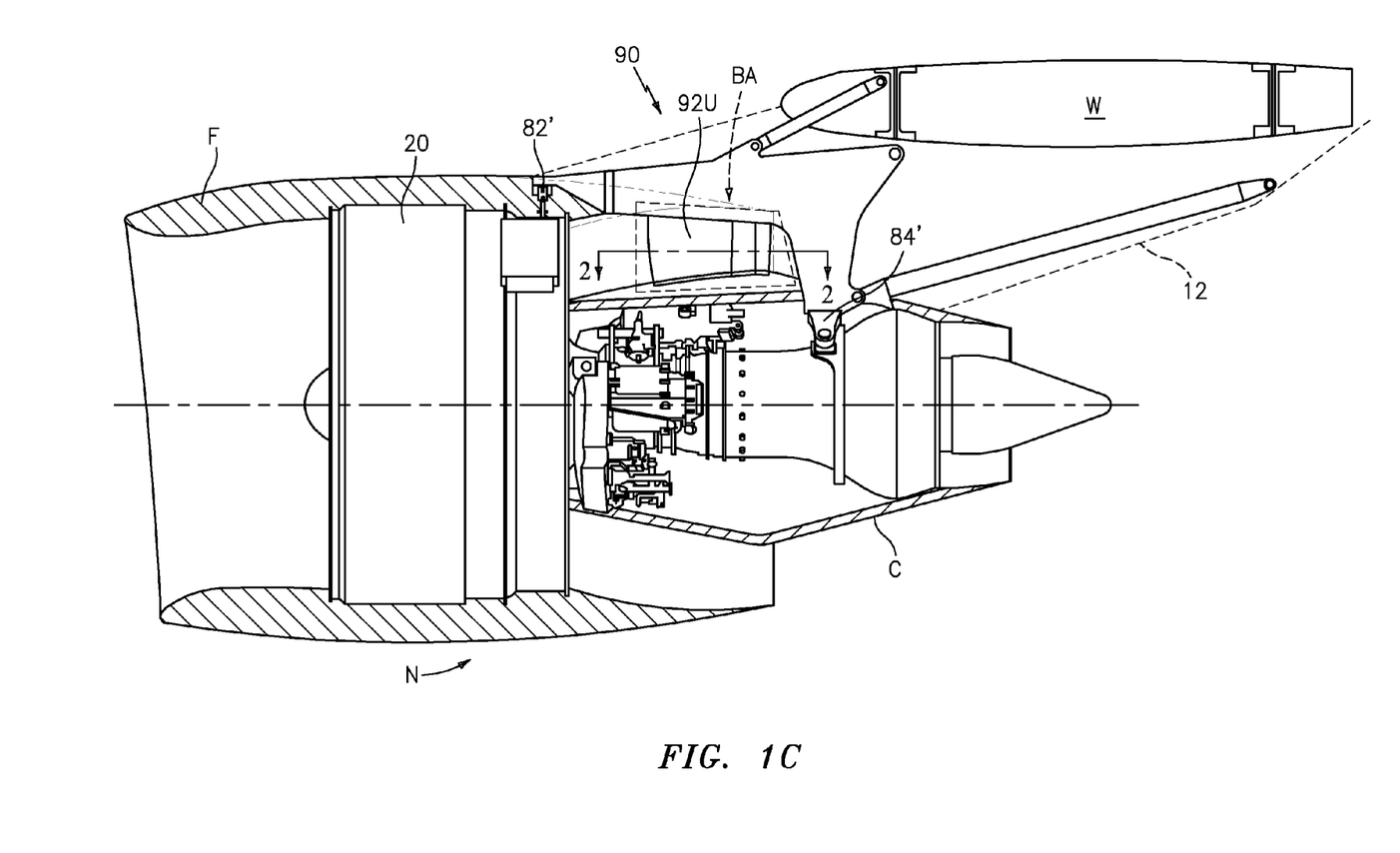
FIG. 1C is a general sectional view illustrating a bifurcation area.
Figure 1D:
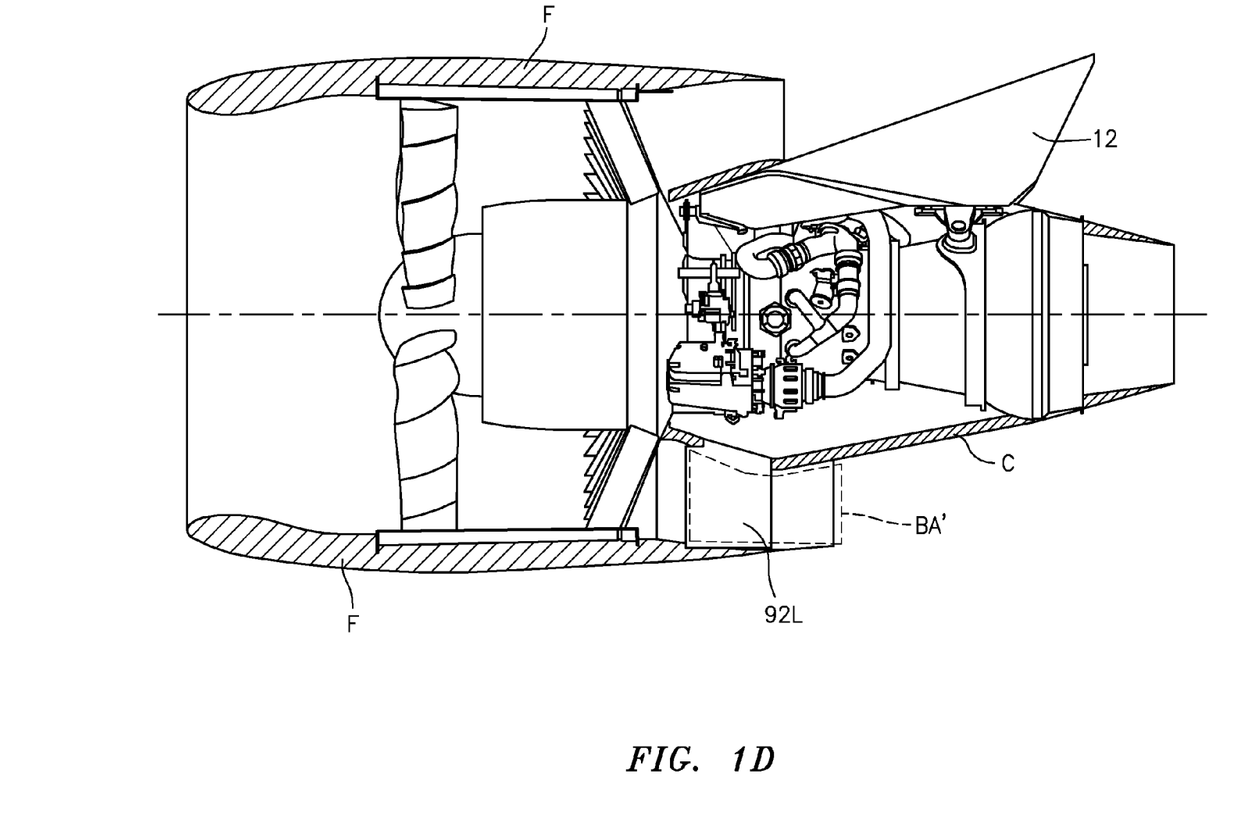
FIG. 1D is a sectional view illustrating another bifurcation area.

Referring to FIG. 1C, a shared flow thermal management system (TMS) 90 is at least partially integrated adjacent the nacelle assembly N, the engine pylon structure 12 and an upper bifurcation (bifi) 92U. This area is generally referred to herein as a bifurcation area BA. It should be understood that the TMS 90 may be located at least partially forward of the pylon structure 12, at least partially within the pylon structure 12, at least partially within the upper bifurcation 92U or any configuration thereof but still be considered as located within a bifurcation area BA as defined herein. Alternatively, if located within a lower section of the engine such as in a lower bifurcations 92L, this area too may be considered as located within a bifurcation area BA as defined herein (FIG. 1D). That is, the TMS 90 may be arranged in various axial positions such that a vertical plane which passes through the engine centerline A and the pylon structure 12 will likely also pass through the TMS 90.

The TMS 90 in one non-limiting embodiment, includes a first heat exchanger HX1, a second heat exchanger HX2, a third heat exchanger HX3 and a fourth heat exchanger HX4 (FIG. 2A) in communication with the bypass flow path 45 through an inlet 94 and an exit 96, axial and lateral space within the upper bifurcation (bifi) 92U adjacent the engine pylon structure 12 locates the heat exchangers HX1, HX2, HX3, HX4 in the bypass flow path 45, facilitates packaging of the TMS 90 and achieves cooling airflow requirements.

Figure 2A:
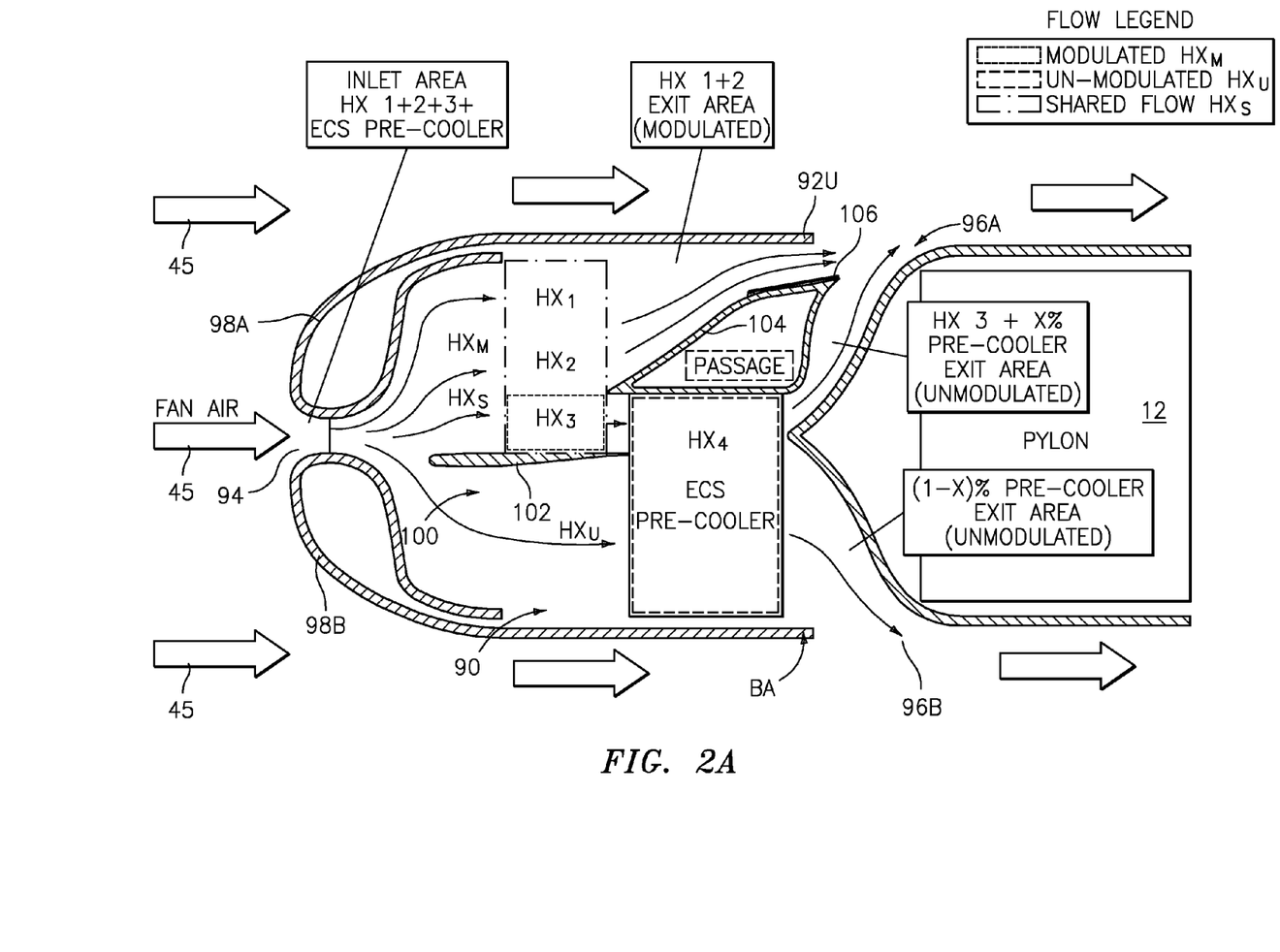
FIG. 2A is a top sectional view of a thermal management system axis.

The TMS 90 locates at least two heat exchangers HX1-HX4, which, when placed in a partial-series configuration, re-use the cooling airflow between the two heat exchangers (in this non-limiting embodiment illustrated as HX3 and HX4) to achieve effective packaging while maintaining cooling airflow requirements. This is provided at least in part by increased-efficiency heat exchangers and the large amount of space available adjacent to the pylon structure 12.

Referring to FIG. 2A, a set of inlet guide vanes 98A, 98B define the inlet 94 such that the heat exchangers HX1-HX4 may be located in a common area and arranged in partial-series to share the inlet 94. Inlet air may be split into a modulated heat exchanger flow HXm, an unmodulated heat exchanger flow HXu and a shared heat exchanger flow HXs. The fourth heat exchanger HX4 in the disclosed non-limiting embodiment is an environmental control system pre-cooler, a portion of which is in the unmodulated heat exchanger flow HXu and a portion of which is in the shared heat exchanger flow HXs. It should be understood that the heat exchangers HX1-HX4 may be air/fluid, fluid/fluid, or air/air heat exchangers. Air/fluid heat exchangers are typically utilized to cool engine fluids to maintain low temperatures. Fluids may be oil used to lubricate engine components such as bearings and gears, or fuel. Fluid/fluid exchangers are typically utilized to preheat engine fuel before combustion to increase cycle efficiency. Air/air heat exchangers are typically utilized to cool high-temperature engine air for use in the aircraft cabin.

The exit 96 in this non-limiting embodiment is split to communicate exit airflow from the heat exchangers HX1-HX4 through a heat exchanger 96A, 96B along both sides of the pylon structure 12. A vane structure 100 is located in response to desired heat exchanger airflow requirements. The vane structure 100 includes an inner guide vane 102 and an outer guide vane 104 between which the shared heat exchanger flow HXs is defined. The outer guide vane 104 further provides for passage of conduits, wiring harness, piping and such like between the engine 10 and the wing W.

Figure 2B:
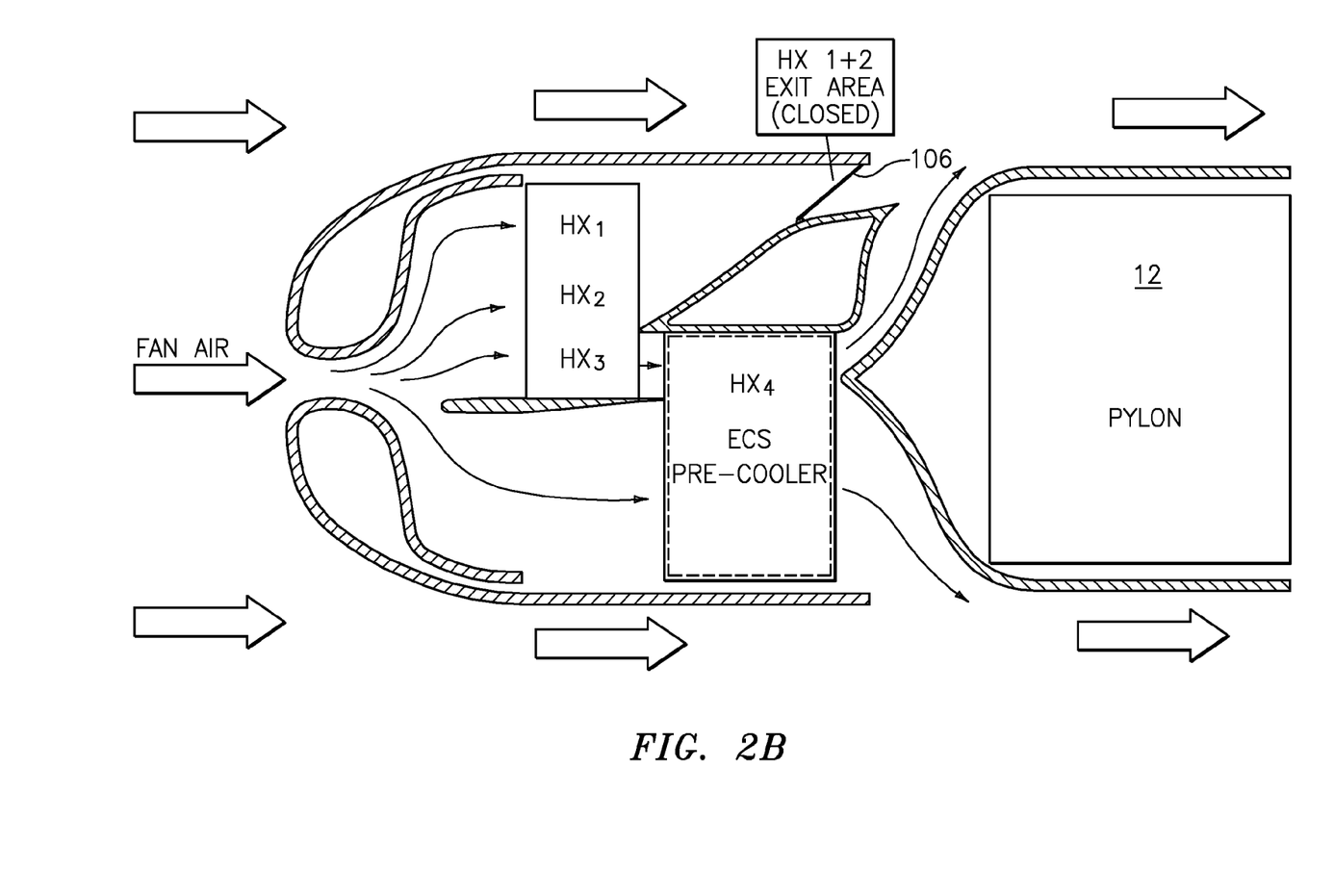
FIG. 2B is a top sectional view of the thermal management system of FIG. 2A with a modulated flow vane moved toward a closed position.

A modulated flow vane 106 is located within the modulated heat exchanger flow HXm to shutter or modulate the exit airflow to provide a desired backpressure or other flow control through the heat exchangers HX1 and HX2. That is, in one example, should the modulated flow vanes 106 be moved toward a closed position (FIG. 2B), airflow though heat exchangers HX1 and HX2 will decrease while airflow through heat exchanger HX3 and HX4 will increase. It should be understood that although a particular inlet and exit arrangement is illustrated in the disclosed, non-limiting embodiment, various inlet and exit combinations which may include combinations of multiple as well as single inlet(s) and exit(s) will benefit herefrom.

The TMS reduces weight as TMS support structure and plumbing are minimized when the heat exchangers are placed directly in the bypass flow path such that ducting length is reduced. Each heat exchanger may also be reduced in size when located in the bypass flow path as the heat exchangers operate in a cooler environment than when placed in the engine core. Bypass aerodynamic efficiency is also increased as a reduction in mix area occurs outside the bypass duct zone. Furthermore, the overall TMS space is reduced and combined into a smaller overall volume due to close-positioning in a space with a more rectilinear shape.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A thermal management system for a gas turbine engine comprising:
    a bifurcation area; and
    a multiple of heat exchangers mounted within said bifurcation area in communication with a bypass flow from the gas turbine engine, at least two of said multiple of heat exchangers arranged in an at least partial-series relationship.

2. The system as recited in claim 1, wherein said bifurcation area is forward of a pylon structure.

3. The system as recited in claim 2, wherein said multiple of heat exchangers are mounted at least partially within an upper bifurcation.

4. The system as recited in claim 1, wherein said bifurcation area is at least partially within an upper bifurcation.

5. The system as recited in claim 1, wherein said multiple of heat exchangers are mounted at least partially within an upper bifurcation.

6. The system as recited in claim 1, wherein said multiple of heat exchangers are mounted forward of a pylon structure.

7. The system as recited in claim 1, further comprising a vane structure which splits said bypass flow into a modulated heat exchanger flow in communication with at least one of said multiple of heat exchangers, an unmodulated heat exchanger flow in communication with at least one of said multiple of heat exchangers and a shared heat exchanger flow in communication with said at least two of said multiple of heat exchangers arranged in said at least partial-series relationship.

8. The system as recited in claim 7, wherein said vane structure defines a first exit and second exit.

9. The system as recited in claim 7, further comprising a modulated flow vane to modulate an exit airflow of said modulated heat exchanger flow.

10. The system as recited in claim 1, further comprising a vane structure which splits said bypass flow to define a first exit and a second exit.

11. The system as recited in claim 10, further comprising a modulated flow vane to modulate an exit airflow from one of said first exist and said second exit.

12. The system as recited in claim 11, wherein said modulated flow vane is movable between an open and a closed position.

13. The system as recited in claim 10, further comprising an inner guide vane and an outer guide vane between which at least one of said multiple of heat exchangers arranged.

14. The system as recited in claim 13, wherein said outer guide vane defines a passage.

15. The system as recited in claim 1, further comprising a vane structure which splits said bypass flow to define a first heat exchanger flow, a second heat exchanger flow and a shared heat exchanger flow.

16. A nacelle assembly for a gas turbine engine comprising:
    a core nacelle defined about an axis;
    a fan nacelle mounted at least partially around said core nacelle, a bypass flow communicated between said core nacelle and said fan nacelle;
    a multiple of heat exchangers mounted within a bifurcation area in communication with said bypass flow, at least two of said multiple of heat exchangers arranged in an at least partial-series relationship; and
    a vane structure which splits said bypass flow into a modulated heat exchanger flow in communication with at least one of said multiple of heat exchangers, an unmodulated heat exchanger flow in communication with at least one of said multiple of heat exchangers and a shared heat exchanger flow in communication with said at least two of said multiple of heat exchangers arranged in said at least partial-series relationship.

17. The assembly as recited in claim 16, wherein said vane structure defines a first exit and second exit.

18. The assembly as recited in claim 16, wherein said first exit and said second exit flank a pylon structure.

19. The assembly as recited in claim 16, further comprising a modulated flow vane to modulate an exit airflow of said modulated heat exchanger flow.

20. A method of thermal management for a gas turbine engine comprising:
    communicating a bypass flow into a multiple of heat exchangers mounted within a bifurcation area in communication with said bypass flow, at least two of said multiple of heat exchangers arranged in an at least partial-series relationship.

21. A method as recited in claim 20, further comprising:
    splitting the bypass flow into a modulated heat exchanger flow in communication with at least one of the multiple of heat exchangers.

22. A method as recited in claim 20, further comprising:
    splitting the bypass flow into an unmodulated heat exchanger flow in communication with at least one of the multiple of heat exchangers.

23. A method as recited in claim 20, further comprising:
splitting the bypass flow into a shared heat exchanger flow in communication with the at least two of the multiple of heat exchangers arranged in the at least partial-series relationship.

24. A method as recited in claim 20, further comprising:
splitting the bypass flow into a modulated heat exchanger flow in communication with at least one of the multiple of heat exchangers, an unmodulated heat exchanger flow in communication with at least one of the multiple of heat exchangers and a shared heat exchanger flow in communication with the at least two of the multiple of heat exchangers arranged in the at least partial-series relationship.

25. A method as recited in claim 24, further comprising:
splitting the bypass flow upstream of the first heat exchanger and the second heat exchanger.

* * * * *

UNITED STATES PATENT AND TRADEMARK OFFICE
CERTIFICATE OF CORRECTION

PATENT NO. : 9,234,481 B2
APPLICATION NO. : 12/019837
DATED : January 12, 2016
INVENTOR(S) : Gabriel L. Suciu Page 1 of 1

It is certified that error appears in the above-identified patent and that said Letters Patent is hereby corrected as shown below:

IN THE CLAIMS:

In claim 11. column 6, line 12; delete "exist" and replace with --exit--

Signed and Sealed this
Twelfth Day of April, 2016

Michelle K. Lee
*Director of the United States Patent and Trademark Office*